United States Patent
Park et al.

(10) Patent No.: US 7,624,299 B2
(45) Date of Patent: *Nov. 24, 2009

(54) WRITE-ONCE OPTICAL DISC, AND METHOD AND APPARATUS FOR RECORDING MANAGEMENT INFORMATION ON WRITE-ONCE OPTICAL DISC

(75) Inventors: Yong Cheol Park, Gwachon-si (KR); Sung Dae Kim, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 267 days.

This patent is subject to a terminal disclaimer.

(21) Appl. No.: 11/652,691

(22) Filed: Jan. 12, 2007

(65) Prior Publication Data

US 2007/0122124 A1 May 31, 2007

Related U.S. Application Data

(63) Continuation of application No. 10/670,335, filed on Sep. 26, 2003, now Pat. No. 7,188,271.

(30) Foreign Application Priority Data

Feb. 25, 2003 (KR) ....................... 10-2003-0011830
Mar. 18, 2003 (KR) ........................... P2003-016775

(51) Int. Cl.
*G06F 11/00* (2006.01)

(52) U.S. Cl. .............................. 714/6; 714/8; 369/53.17

(58) Field of Classification Search ........................ None
See application file for complete search history.

(56) References Cited

U.S. PATENT DOCUMENTS 4,558,446 A   12/1985   Banba et al.
4,733,386 A    3/1988   Shimoi et al.

(Continued)

FOREIGN PATENT DOCUMENTS

CN          1134017 A      10/1996

(Continued)

OTHER PUBLICATIONS

JIS handbook data processing for hardware, Japan, Japanese Standards Association Inc., Apr. 21, 1999, pp. 1064-1070.
ECMA: "ECMA238 Data interchange on 130mm Optical Disks of Type WORM using irreversible effects - capacity 2,6 Gbytes per cartridge", Internet Citation (online), Jun. 1996, XP002289010.

*Primary Examiner*—Yolanda L Wilson
(74) *Attorney, Agent, or Firm*—Birch, Stewart, Kolasch & Birch, LLP

(57) ABSTRACT

A writable-once optical recording medium such as a BD-WO, and a method and apparatus for managing the writable-once optical recording medium, are provided. According to an embodiment, the method includes recording temporary management information in a temporary defect management area of the recording medium, the temporary management information including disc usage management information indicating a recording or non-recording status of the user area of the each recording layer; and transferring the disc usage management information from the at least one temporary defect management area to the at least one final defect management area of the recording medium, wherein in the recording step, the disc usage management information for each of the recording layers is separately recorded in the temporary defect management area.

20 Claims, 12 Drawing Sheets

U.S. PATENT DOCUMENTS

| | | |
|---|---|---|
| 4,807,205 A | 2/1989 | Picard et al. |
| 4,963,866 A | 10/1990 | Duncan |
| 5,068,842 A | 11/1991 | Naito et al. |
| 5,111,444 A | 5/1992 | Fukushima et al. |
| 5,210,734 A | 5/1993 | Sakurai et al. |
| 5,235,585 A | 8/1993 | Bish et al. |
| 5,237,553 A | 8/1993 | Fukushima et al. |
| 5,247,494 A | 9/1993 | Ohno et al. |
| 5,319,626 A | 6/1994 | Ozaki et al. |
| 5,404,357 A | 4/1995 | Ito et al. |
| 5,442,611 A | 8/1995 | Hosaka et al. |
| 5,448,728 A | 9/1995 | Takano et al. |
| 5,475,820 A | 12/1995 | Natrasevschi et al. |
| 5,481,519 A | 1/1996 | Hosoya et al. |
| 5,495,466 A | 2/1996 | Dohmeier et al. |
| 5,528,571 A | 6/1996 | Funahashi et al. |
| 5,553,045 A | 9/1996 | Obata et al. |
| 5,577,194 A | 11/1996 | Wells et al. |
| 5,608,715 A | 3/1997 | Yokogawa et al. |
| 5,715,221 A | 2/1998 | Ito et al. |
| 5,720,030 A | 2/1998 | Kamihara et al. |
| 5,740,435 A | 4/1998 | Yamamoto et al. |
| 5,745,444 A | 4/1998 | Ichikawa et al. |
| 5,799,212 A | 8/1998 | Ohmori et al. |
| 5,802,028 A | 9/1998 | Igarashi et al. |
| 5,805,536 A | 9/1998 | Gage et al. |
| 5,848,038 A | 12/1998 | Igarashi et al. |
| 5,867,455 A | 2/1999 | Miyamoto et al. |
| 5,878,020 A | 3/1999 | Takahashi |
| 5,914,928 A | 6/1999 | Takahashi et al. |
| 5,940,702 A | 8/1999 | Sakao et al. |
| 6,058,085 A | 5/2000 | Obata et al. |
| 6,118,608 A | 9/2000 | Kakihara et al. |
| 6,138,203 A | 10/2000 | Inokuchi et al. |
| 6,160,778 A | 12/2000 | Ito et al. |
| 6,189,118 B1 | 2/2001 | Sasaki et al. |
| 6,233,654 B1 | 5/2001 | Aoki et al. |
| 6,292,445 B1 | 9/2001 | Ito et al. |
| 6,341,109 B1 | 1/2002 | Kayanuma et al. |
| 6,341,278 B1 | 1/2002 | Yamamoto et al. |
| 6,373,800 B1 | 4/2002 | Takahashi et al. |
| 6,405,332 B1 | 6/2002 | Bando et al. |
| 6,414,923 B1 | 7/2002 | Park et al. |
| 6,447,126 B1 | 9/2002 | Hornbeck |
| 6,466,532 B1 | 10/2002 | Ko et al. |
| 6,469,978 B1 | 10/2002 | Ohata et al. |
| 6,477,126 B1 | 11/2002 | Park et al. |
| 6,480,446 B1 | 11/2002 | Ko et al. |
| 6,493,301 B1 | 12/2002 | Park et al. |
| 6,496,807 B1 | 12/2002 | Inokuchi et al. |
| 6,529,458 B1 | 3/2003 | Shin et al. |
| 6,542,450 B1 | 4/2003 | Park et al. |
| 6,564,345 B1 | 5/2003 | Kim et al. |
| 6,581,167 B1 | 6/2003 | Gotoh et al. |
| 6,606,285 B1 | 8/2003 | Ijtsma et al. |
| 6,615,363 B1 | 9/2003 | Fukasawa et al. |
| 6,631,106 B1 | 10/2003 | Numata et al. |
| 6,633,724 B1 | 10/2003 | Hasegawa et al. |
| 6,667,939 B1 | 12/2003 | Miyamoto et al. |
| 6,671,249 B2 | 12/2003 | Horie et al. |
| 6,697,306 B2 | 2/2004 | Sako et al. |
| 6,714,502 B2 | 3/2004 | Ko et al. |
| 6,724,701 B2 | 4/2004 | Ijtsma et al. |
| 6,738,341 B2 | 5/2004 | Ohata et al. |
| 6,754,860 B2 | 6/2004 | Kim et al. |
| 6,760,288 B2 | 7/2004 | Ijtsma et al. |
| 6,763,429 B1 | 7/2004 | Hirayama et al. |
| 6,766,418 B1 | 7/2004 | Alexander et al. |
| 6,785,206 B1 | 8/2004 | Lee et al. |
| 6,788,631 B1 | 9/2004 | Park et al. |
| 6,795,389 B1 | 9/2004 | Nishiuchi et al. |
| 6,804,797 B2 | 10/2004 | Ko et al. |
| 6,826,140 B2 | 11/2004 | Brommer et al. |
| 6,842,580 B1 | 1/2005 | Ueda et al. |
| 6,845,069 B2 | 1/2005 | Nakahara et al. |
| 6,883,111 B2 | 4/2005 | Yoshida et al. |
| 6,918,003 B2 | 7/2005 | Sasaki et al. |
| 6,922,802 B2 * | 7/2005 | Kim et al. .................. 714/723 |
| 6,934,236 B2 | 8/2005 | Lee et al. |
| 6,999,398 B2 | 2/2006 | Yamamoto et al. |
| 7,002,882 B2 | 2/2006 | Takahashi et al. |
| 7,027,059 B2 | 4/2006 | Hux et al. |
| 7,027,373 B2 | 4/2006 | Ueda et al. |
| 7,042,825 B2 | 5/2006 | Yamamoto et al. |
| 7,050,701 B1 | 5/2006 | Sasaki et al. |
| 7,092,334 B2 | 8/2006 | Choi et al. |
| 7,123,556 B2 | 10/2006 | Ueda et al. |
| 7,149,930 B2 | 12/2006 | Ogawa et al. |
| 7,161,879 B2 | 1/2007 | Hwang et al. |
| 7,184,377 B2 | 2/2007 | Ito et al. |
| 7,188,271 B2 | 3/2007 | Park et al. |
| 7,233,550 B2 | 6/2007 | Park et al. |
| 7,236,687 B2 | 6/2007 | Kato et al. |
| 7,272,086 B2 | 9/2007 | Hwang et al. |
| 7,289,404 B2 | 10/2007 | Park et al. |
| 7,296,178 B2 | 11/2007 | Yoshida et al. |
| 7,313,066 B2 | 12/2007 | Hwang et al. |
| 7,327,654 B2 | 2/2008 | Hwang et al. |
| 7,349,301 B2 | 3/2008 | Terada et al. |
| 7,379,402 B2 | 5/2008 | Ko et al. |
| 2001/0009537 A1 | 7/2001 | Park |
| 2001/0011267 A1 | 8/2001 | Kihara et al. |
| 2001/0026511 A1 | 10/2001 | Ueda et al. |
| 2001/0043525 A1 | 11/2001 | Ito et al. |
| 2001/0043800 A1 | 11/2001 | Gotoh et al. |
| 2002/0025138 A1 | 2/2002 | Isobe et al. |
| 2002/0097665 A1 | 7/2002 | Ko et al. |
| 2002/0097666 A1 | 7/2002 | Ko et al. |
| 2002/0099950 A1 | 7/2002 | Smith |
| 2002/0136118 A1 | 9/2002 | Takahashi |
| 2002/0136134 A1 | 9/2002 | Ito et al. |
| 2002/0136537 A1 | 9/2002 | Takahashi |
| 2002/0159382 A1 | 10/2002 | Ohata et al. |
| 2002/0161774 A1 | 10/2002 | Tol et al. |
| 2002/0176341 A1 | 11/2002 | Ko et al. |
| 2003/0072236 A1 | 4/2003 | Hirotsune et al. |
| 2003/0095482 A1 | 5/2003 | Hung et al. |
| 2003/0126527 A1 | 7/2003 | Kim et al. |
| 2003/0135800 A1 | 7/2003 | Kim et al. |
| 2003/0137909 A1 | 7/2003 | Ito et al. |
| 2003/0137910 A1 | 7/2003 | Ueda et al. |
| 2003/0142608 A1 | 7/2003 | Yamamoto et al. |
| 2003/0149918 A1 | 8/2003 | Takaichi |
| 2003/0173669 A1 | 9/2003 | Shau |
| 2003/0198155 A1 | 10/2003 | Go et al. |
| 2004/0001408 A1 | 1/2004 | Propps et al. |
| 2004/0004917 A1 | 1/2004 | Lee |
| 2004/0062159 A1 | 4/2004 | Park et al. |
| 2004/0062160 A1 | 4/2004 | Park et al. |
| 2004/0076096 A1 | 4/2004 | Hwang et al. |
| 2004/0105363 A1 | 6/2004 | Ko et al. |
| 2004/0114474 A1 | 6/2004 | Park et al. |
| 2004/0120233 A1 | 6/2004 | Park et al. |
| 2004/0125716 A1 | 7/2004 | Ko et al. |
| 2004/0125717 A1 | 7/2004 | Ko et al. |
| 2004/0136292 A1 | 7/2004 | Park et al. |
| 2004/0145980 A1 | 7/2004 | Park et al. |
| 2004/0158768 A1 | 8/2004 | Park et al. |
| 2004/0174782 A1 | 9/2004 | Lee et al. |
| 2004/0174785 A1 | 9/2004 | Ueda et al. |
| 2004/0179445 A1 | 9/2004 | Park et al. |
| 2004/0179458 A1 | 9/2004 | Hwang et al. |
| 2004/0193946 A1 | 9/2004 | Park et al. |
| 2004/0223427 A1 | 11/2004 | Kim et al. |

| | | | | | | |
|---|---|---|---|---|---|---|
| 2004/0246851 | A1 | 12/2004 | Hwang et al. | JP | 10-050005 A | 2/1998 |
| 2005/0007910 | A1 | 1/2005 | Ito et al. | JP | 10-050032 A | 2/1998 |
| 2005/0008346 | A1 | 1/2005 | Noguchi et al. | JP | 10-187356 | 7/1998 |
| 2005/0025007 | A1 | 2/2005 | Park | JP | 10-187357 | 7/1998 |
| 2005/0047294 | A1 | 3/2005 | Park | JP | 10-187358 | 7/1998 |
| 2005/0050402 | A1 | 3/2005 | Koda et al. | JP | 10-187359 | 7/1998 |
| 2005/0052972 | A1 | 3/2005 | Park | JP | 10-187360 | 7/1998 |
| 2005/0052973 | A1 | 3/2005 | Park | JP | 10-187361 A1 | 7/1998 |
| 2005/0055500 | A1 | 3/2005 | Park | JP | 11-86418 A | 3/1999 |
| 2005/0060489 | A1 | 3/2005 | Park | JP | 11-086436 | 3/1999 |
| 2005/0068877 | A1 | 3/2005 | Yeo | JP | 11-110888 A | 4/1999 |
| 2005/0083740 | A1 | 4/2005 | Kobayashi | JP | 11-203792 A | 7/1999 |
| 2005/0083767 | A1 | 4/2005 | Terada et al. | JP | 2000-090588 A | 3/2000 |
| 2005/0083830 | A1 | 4/2005 | Martens et al. | JP | 2000-149449 A | 5/2000 |
| 2005/0195716 | A1 | 9/2005 | Ko et al. | JP | 2000-195178 A | 7/2000 |
| 2005/0207262 | A1 | 9/2005 | Terada et al. | JP | 2000-215612 | 8/2000 |
| 2005/0289389 | A1 | 12/2005 | Yamagami et al. | JP | 2000-285607 | 10/2000 |
| 2006/0077827 | A1 | 4/2006 | Takahashi | JP | 2001-023317 A | 1/2001 |
| 2006/0195719 | A1 | 8/2006 | Ueda et al. | JP | 2001-069440 A | 3/2001 |
| 2006/0203635 | A1 | 9/2006 | Ko et al. | JP | 2001-110168 A | 4/2001 |
| 2006/0203638 | A1 | 9/2006 | Ko et al. | JP | 2001-351334 A | 12/2001 |
| 2006/0203684 | A1 | 9/2006 | Ko et al. | JP | 2001-357623 A | 12/2001 |
| 2006/0227694 | A1 | 10/2006 | Woerlee et al. | JP | 2002-015507 A | 1/2002 |
| 2007/0294571 | A1 | 12/2007 | Park et al. | JP | 2002-015525 A | 1/2002 |
| 2008/0046780 | A1 | 2/2008 | Shibuya et al. | JP | 2002-056619 A | 2/2002 |
| | | | | JP | 2002-157832 A | 5/2002 |
| FOREIGN PATENT DOCUMENTS | | | | JP | 2002-215612 A | 8/2002 |
| CN | 1140897 C | | 1/1997 | JP | 2002-245723 A | 8/2002 |
| CN | 1227950 A | | 9/1999 | JP | 2002-288938 A | 10/2002 |
| CN | 1273419 A | | 11/2000 | JP | 2002-329321 A | 11/2002 |
| CN | 1675708 A | | 8/2003 | JP | 2002-352522 A | 12/2002 |
| CN | 1675708 A | | 9/2005 | JP | 2003-536194 A | 12/2003 |
| CN | 1685426 A | | 10/2005 | JP | 2004-280864 A | 10/2004 |
| DE | 199 54 054 A1 | | 6/2000 | JP | 2004-280865 A | 10/2004 |
| EP | 0314186 A2 | | 5/1989 | JP | 2005-056542 A | 3/2005 |
| EP | 0325823 A1 | | 8/1989 | JP | 2005-004912 A | 6/2005 |
| EP | 0350920 A2 | | 1/1990 | JP | 2005-535993 A | 11/2005 |
| EP | 0464811 A2 | | 1/1992 | JP | 2005-538490 A | 12/2005 |
| EP | 0472484 A2 | | 2/1992 | JP | 2005-538491 A | 12/2005 |
| EP | 0477503 A2 | | 4/1992 | JP | 2006-519445 A | 8/2006 |
| EP | 0556046 A1 | | 8/1993 | KR | 1020040094301 A | 11/2004 |
| EP | 0871172 A2 | | 10/1998 | RU | 2005 103 626 | 9/2005 |
| EP | 0908882 A2 | | 4/1999 | RU | 2005 127 337 | 2/2006 |
| EP | 0974967 A1 | | 1/2000 | TW | 371752 | 10/1999 |
| EP | 0989554 A1 | | 3/2000 | TW | 413805 | 12/2000 |
| EP | 0997904 A1 | | 5/2000 | WO | WO-84/00628 A1 | 2/1984 |
| EP | 1026681 B1 | | 8/2000 | WO | WO-96/30902 A1 | 10/1996 |
| EP | 1043723 A1 | | 10/2000 | WO | WO-97/22182 A1 | 6/1997 |
| EP | 1132914 A2 | | 9/2001 | WO | WO-00154274 A1 | 9/2000 |
| EP | 1148493 A2 | | 10/2001 | WO | WO-01/22416 A1 | 3/2001 |
| EP | 1152414 A2 | | 11/2001 | WO | WO-01/93035 A2 | 12/2001 |
| EP | 1239478 A1 | | 9/2002 | WO | WO-01/95330 A2 | 12/2001 |
| EP | 1274081 A2 | | 1/2003 | WO | WO-03/007296 A1 | 1/2003 |
| EP | 1298659 A1 | | 4/2003 | WO | WO-03/025924 A1 | 3/2003 |
| EP | 1329888 A1 | | 7/2003 | WO | WO-03/079353 A1 | 9/2003 |
| EP | 1347452 A2 | | 9/2003 | WO | WO-2004/015707 A1 | 2/2004 |
| EP | 1547065 A0 | | 6/2005 | WO | WO-2004/015708 A1 | 2/2004 |
| EP | 1564740 A1 | | 8/2005 | WO | WO-2004025648 | 3/2004 |
| EP | 1573723 A0 | | 9/2005 | WO | WO-2004025649 | 3/2004 |
| EP | 1612790 A1 | | 1/2006 | WO | WO-2004/029668 A2 | 4/2004 |
| EP | 1623422 A0 | | 2/2006 | WO | WO-2004/029941 A1 | 4/2004 |
| GB | 2356735 A | | 5/2001 | WO | WO-2004/034396 A1 | 4/2004 |
| JP | 63-091842 A | | 4/1988 | WO | WO-2004/036561 A1 | 4/2004 |
| JP | 01-263955 A | | 10/1989 | WO | WO-2004/053872 A1 | 6/2004 |
| JP | 02-023417 A | | 1/1990 | WO | WO-2004/053874 A1 | 6/2004 |
| JP | 4172662 A | | 6/1992 | WO | WO-2004/059648 A2 | 7/2004 |
| JP | 05-274814 A | | 10/1993 | WO | WO-2004/068476 A1 | 8/2004 |
| JP | 06-349201 A | | 12/1994 | WO | WO-2004/075180 A1 | 9/2004 |
| JP | 8-50766 A | | 2/1996 | WO | WO-2004/079731 A1 | 9/2004 |
| JP | 08-096522 A | | 4/1996 | WO | WO-2004/079740 A1 | 9/2004 |
| JP | 09-145634 A | | 6/1997 | WO | WO-2004/081926 A1 | 9/2004 |
| JP | 09-231053 A | | 9/1997 | WO | WO-2004079631 | 9/2004 |
| | | | | WO | WO-2004/093035 A1 | 10/2004 |

| | | | | | | |
|---|---|---|---|---|---|---|
| WO | WO-2004/100155 | A1 | 11/2004 | WO | WO-2005/004154 A2 | 1/2005 |
| WO | WO-2004/100156 | A1 | 11/2004 | | | |
| WO | WO-2005/004123 | A1 | 1/2005 | * cited by examiner | | |

Tracking direction →

| | Cluster 1 | Cluster 2 | Cluster 3 | ... | Cluster 31 | Cluster 32 |
|---|---|---|---|---|---|---|
| Layer L0 | | | | | | |
| Layer L1 | Cluster 64 | Cluster 63 | ... | Cluster 35 | Cluster 34 | Cluster 33 |

← Tracking direction

| Clusters 1 ~ 4 | DDS (4 repetitions) |
|---|---|
| Clusters 5 ~ 8 | Reserved |
| Clusters 9 ~ 16 | 1st position of DFL |
| ⋮ | ⋮ |
| Clusters 57 ~ 64 | 7th position of DFL |

WRITE-ONCE OPTICAL DISC, AND METHOD AND APPARATUS FOR RECORDING MANAGEMENT INFORMATION ON WRITE-ONCE OPTICAL DISC

This application is a continuation of U.S. application Ser. No. 10/670,335 filed Sep. 26, 2003 now U.S. Pat. No. 7,188,271 and claims the priority benefit of Korean Patent Application No. P2003-011830 filed on Feb. 25, 2003 and No. P2003-016775 filed on Mar. 18, 2003. The entire contents of all these applications are herein fully incorporated by reference.

BACKGROUND OF THE INVENTION

1. Field of the Invention

The present invention relates to a writable-once optical disc and a management information recording method and apparatus, and more particularly, to a method and apparatus for efficiently recording disc usage management information on a writable-once optical disc.

2. Discussion of the Background Art

Optical disc, which is a kind of optical recording media and can record a large amount of data, is widely being used. Today, a kind of innovative high-density digital versatile disc (HD-DVD) such as a blue ray disc (Blu-ray Disc), which can record and store video data of high quality and audio data of high fidelity for a long time, is under development.

The Blu-ray disc is a next generation optical recording solution that can store a larger amount of data than a conventional DVD. The Blu-ray disc employs a blue-violet laser with the wavelength of 405 nm which is shorter than the wavelength of 650 nm of a red laser used to access a conventional DVD. The Blu-ray disc has generally a thickness of 1.2 mm and a diameter of 12 cm. It includes a light transmission layer whose thickness is 0.1 mm so that the Blu-ray disc can store a larger amount of data than the current DVDs.

Various standards related to the Blu-ray discs are in development. Among the different types of Blu-ray discs, a Blu-ray Disc Rewritable (BD-RE) and a Blu-ray Disc Write-Once (BD-WO) are being developed.

FIG. 1 schematically illustrates a structure of a recording area of a general BD-RE. Referring to FIG. 1, the BD-RE includes a recording layer divided into a lead-in area, a data area and a lead-out area. The data area includes a user data area for recording user data thereon, and an inner spare area ISA0 and an outer spare area OSA0 each allocated in the inner tracks and the outer tracks of the disc. These spare areas are used as replacement areas for replacing data in a defective area of the user data area according to linear replacement.

In the BD-RE, if a defective area is found in the user data area during recording, data in the defective area is transferred to and recorded on a spare area using linear replacement. Further, as defect management information for managing the defective area, position information and the like relating to the defective area and the corresponding spare area are recorded on defect management areas (DMA 1~DMA 4) in the lead-in area and the lead-out area. Also, since data can be recorded on and erased from any area of the BD-RE repeatedly (since the BD-RE is rewritable), the entire BD-RE can be randomly used irrespective of a specific recording mode.

In contrast, in a writable-once Blu-ray disc (BD-WO), data can be recorded only one time on a specific area of the disc. As a result, the BD-WO has certain limitations pertaining to recording modes and in randomly using the entire area of the disc due to the defect management difficulty.

Further, in a BD-WO, management of the defective areas is one of the important matters that needs to be addressed, especially for data recording operations. But since the BD-WO is still in the early development stage, there are no schemes, no disc structures, no apparatuses, and no methods on how to manage the defective areas of the BD-WO, which will be needed for the BD-WO to be commercially viable and operationally feasible. Accordingly, for the BD-WO, a unified specification is required that would satisfy the aforementioned advanced requirements. But any proposed specification relating to the current BD-RE cannot be used because it does not address the needs of the BD-WO.

SUMMARY OF THE INVENTION

Accordingly, the present invention is directed to a writable-once optical disc and a management information recording method and apparatus that substantially obviate one or more problems due to limitations and disadvantages of the background art.

An object of the present invention is to provide a writable-once optical disc and a management information recording method and apparatus for effectively recording and managing disc usage management information therein.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method of managing a writable-once optical recording medium, the recording medium including at least one recording layer, the method comprising: providing a user area and a non-user area on the at least one recording layer of the recording medium; providing at least one temporary defect management area in at least one of the user area and the non-user area, the at least one temporary defect management area allocated to store therein temporary defect management information including disc usage management information, the disc usage management information indicating a recording or non-recording status of the user area of the recording medium; and providing at least one final defect management area in the non-user area.

In accordance with an aspect of the present invention, a method of managing a writable-once optical recording medium, the recording medium including at least one recording layer, the at least one recording layer having at least one temporary defect management area and at least one final defect management area, includes: recording temporary defect management information in the at least one temporary defect management area of the recording medium, the temporary defect management information including disc usage management information indicating a recording use status of the recording medium; and transferring the temporary defect management information from the at least one temporary defect management area to the at least one final defect management area of the recording medium.

In accordance with an aspect of the present invention, an apparatus for managing a writable-once optical recording medium, the recording medium including at least one recording layer, includes a combination of components configured for: providing a user area and a non-user area on the at least one recording layer of the recording medium; providing at least one temporary defect management area in at least one of the user area and the non-user area, the at least one temporary defect management area allocated to store therein temporary defect management information including disc usage management information, the disc usage management information indicating a recording or non-recording status of the user area of the recording medium; and providing at least one final defect management area in the non-user area.

In accordance with an aspect of the present invention, an apparatus for managing a writable-once optical recording medium, the recording medium including at least one recording layer, the at least one recording layer having at least one temporary defect management area and at least one final defect management area, the apparatus includes a combination of components configured for: recording temporary defect management information in the at least one temporary defect management area of the recording medium, the temporary defect management information including disc usage management information indicating a recording use status of the recording medium; and transferring the temporary defect management information from the at least one temporary defect management area to the at least one final defect management area of the recording medium.

In accordance with an aspect of the present invention, a writable-once optical recording medium includes: at least one recording layer including a user area and a non-user area; at least one temporary defect management area provided in at least one of the user area and the non-user area of the recording medium, so as to store therein temporary defect management information including disc usage management information, the disc usage management information indicating a recording or non-recording status of the user area of the recording medium; and at least one final defect management area provided in the non-user area.

In accordance with an aspect of the present invention, a writable-once optical recording medium includes: at least one recording layer including at least one temporary defect management area and at least one final defect management area, wherein temporary defect management information is recorded in the at least one temporary defect management area of the recording medium, the temporary defect management information including disc usage management information indicating a recording use status of the recording medium, and wherein the temporary defect management information is transferred from the at least one temporary defect management area to the at least one final defect management area of the recording medium.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 6A and 6B illustrate a structure of the clusters in a DMA of a dual layer BD-RE, for explaining further the aspects of the present invention;

DETAILED DESCRIPTION OF THE PREFERRED EMBODIMENTS

Figure 1:
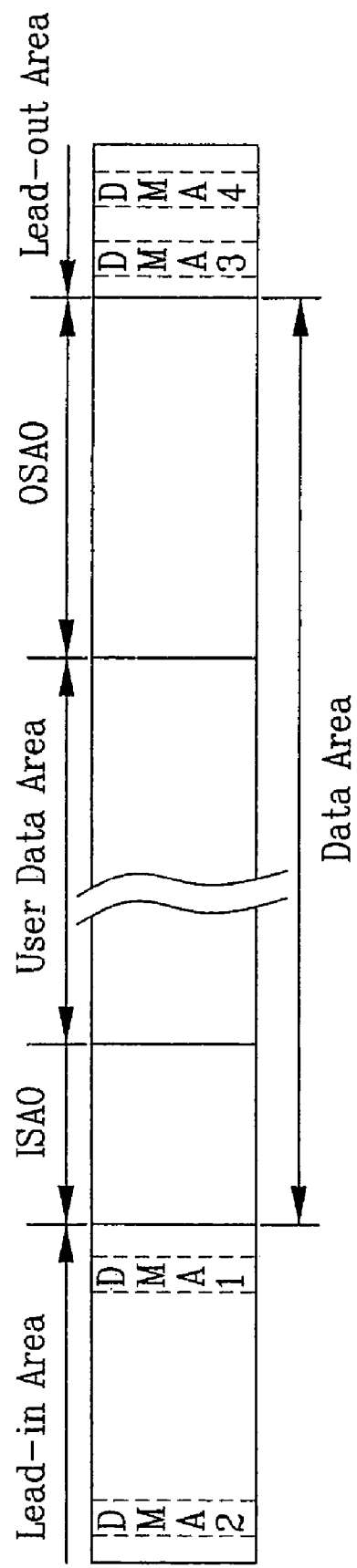
FIG. 1 schematically illustrates a structure of a general single-layer BD-RE.

Reference will now be made in detail to the preferred embodiments of the present invention, examples of which are illustrated in the accompanying drawings. Wherever possible, the same reference numerals will be used throughout the drawings to refer to the same or like parts.

Figure 2:
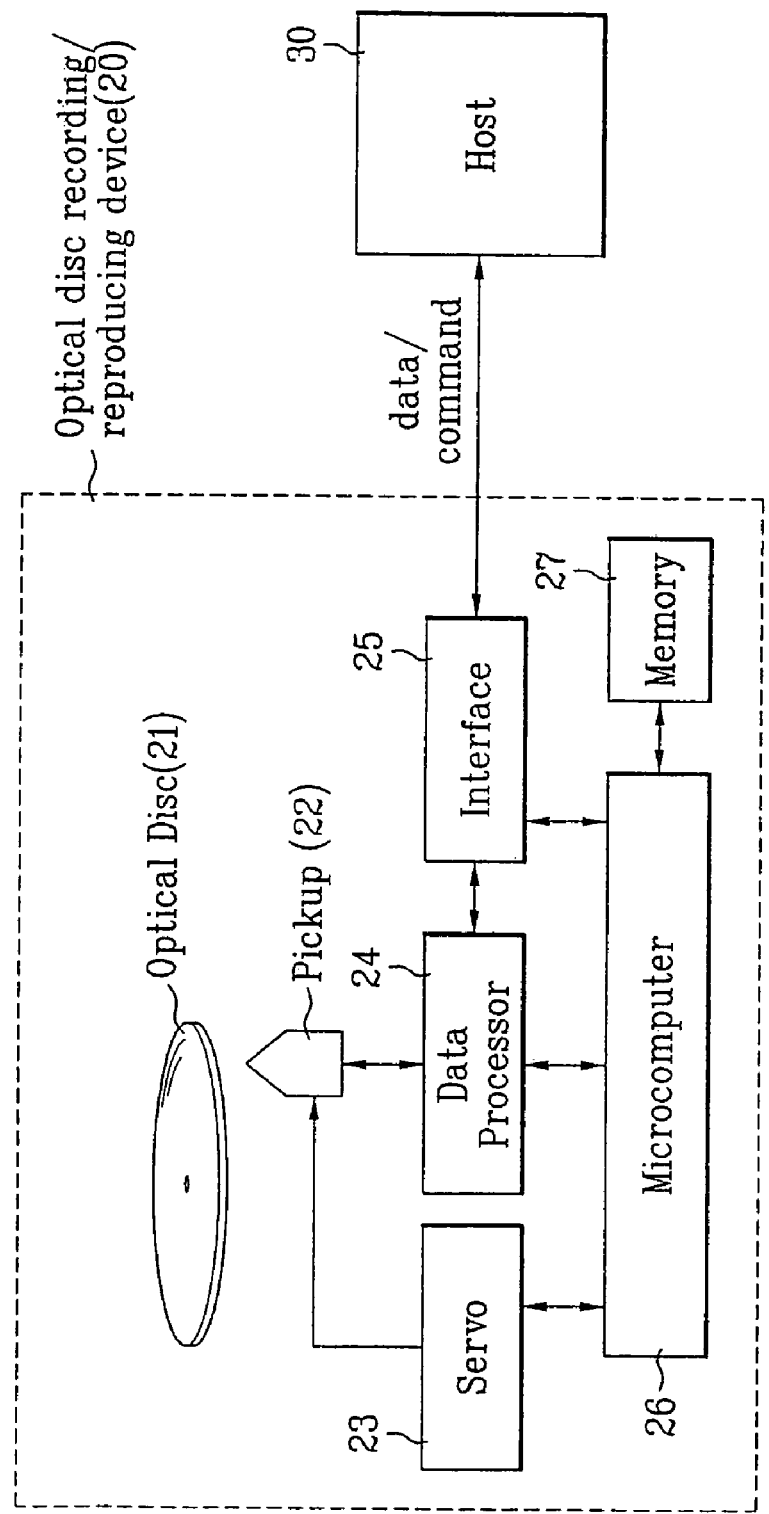
FIG. 2 is a block diagram of an optical recording/reproducing device according the present invention.

FIG. 2 is an example of a block diagram of an optical disc recording/reproducing device 20 according to an embodiment of the present invention. The optical disc recording/reproducing device 20 includes an optical pickup 22 for writing/reading data to/from an optical recording medium 21, a servo unit 23 for controlling the pickup 22 to maintain a distance between an objective lens of the pickup 22 and the recording medium 21 and for tracking relevant tracks on the recording medium 21, a data processor 24 for processing and supplying input data to the pickup 22 for writing, and for processing data read from the recording medium 21, an interface 25 for exchanging data and/or commands with any external host 30, a memory or storage 27 for storing information and data therein including defect management data as needed (e.g., temporary defect management information, etc.) associated with the recording medium 21, and a microprocessor or controller 26 for controlling the operations and elements of the recording/reproducing device 20. Data to be written/read to/from the recording medium 21 may also be stored in the memory 27 if needed. All the components of the recording/ reproducing device 20 are operatively coupled. The recording medium 21 is a recording medium of write-once type such as a BD-WO.

All the methods and disc structures discussed herein according to the present invention can be implemented using the recording/reproducing device 20 of FIG. 2 or any other suitable device/system. For example, the microcomputer 26 of the device 20 may be used to control allocation of the disc structure and to control the recording of defect management data on the recording medium and the transferring of the defect management data from a temporary area (e.g., TDMA) to a permanent or final area (e.g., DMA) on the recording medium 21. The TDMA and DMA will be discussed later in more detail.

A defect management information recording method for a writable-once optical disc such as a BD-WO according to the preferred embodiments of the present invention will be now described in detail with reference to the accompanying drawings. For a discussion convenience, a writable-once Blu-ray disc (BD-WO) will be exemplified. Herein, two types of a BD-WO—a single layer BD-WO and a dual layer BD-WO—are discussed. The single layer BD-WO has a single recording layer, whereas the dual layer BD-WO has two recording layers.

Figure 3:
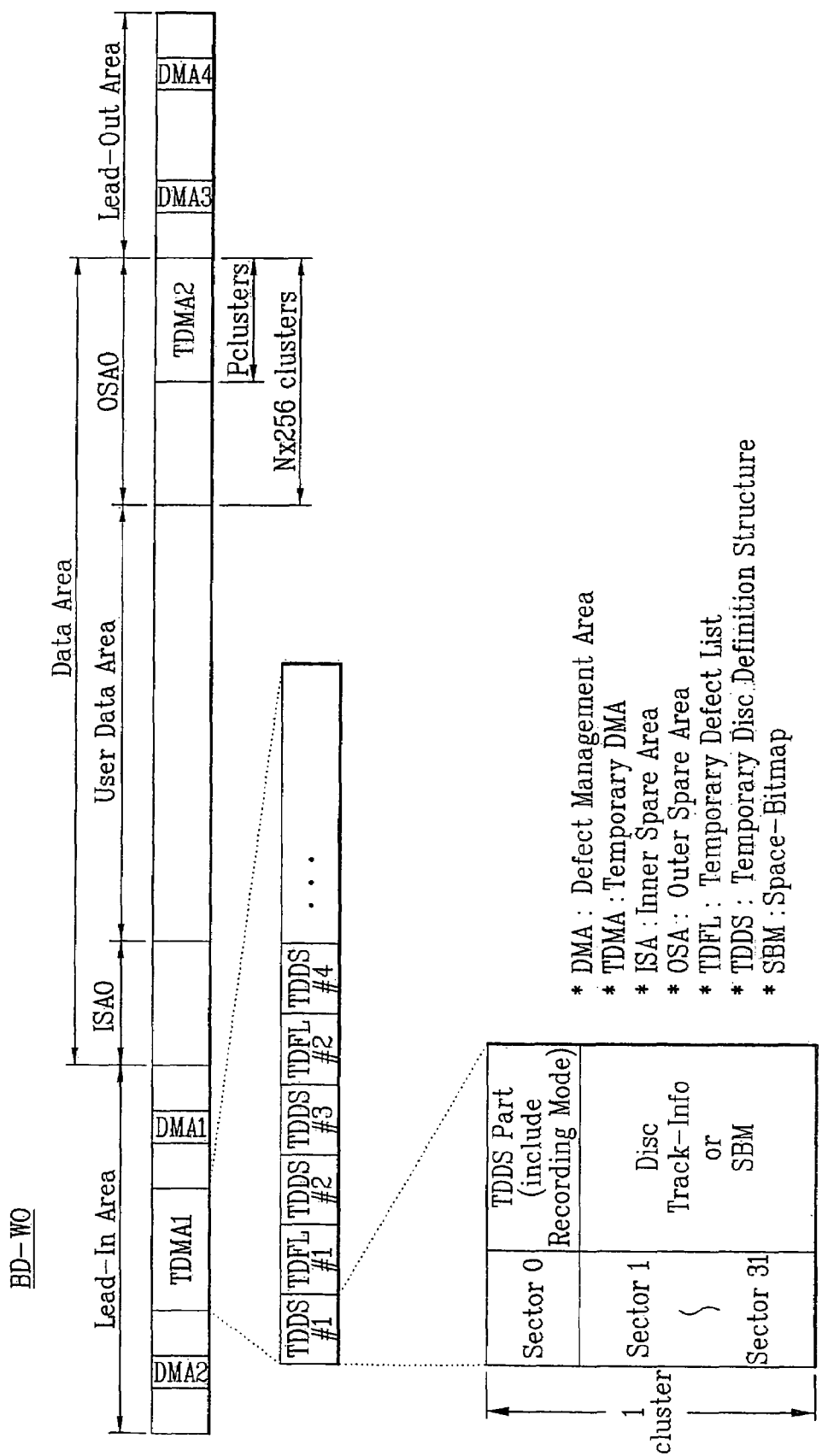
FIG. 3 illustrates a structure of a writable-once optical disc such as a single layer BD-WO according to an embodiment of the present invention.

FIG. 3 illustrates a structure of a writable-once optical recording medium such as a single-layer BD-WO according to an embodiment of the present invention. Referring to FIG. 3, the BD-WO includes a lead-in area, a data area, and a lead-out area allocated on the single recording layer. Each of the lead-in area and the lead-out area includes a plurality of defect management areas (DMA 1 and DMA 2; DMA 3 and DMA 4) for storing therein DMA information for defect management. Each of the DMAs 1-4 has a fixed size, e.g., 32 clusters. Generally, in view of the importance of defect management, the same information is written in each of the DMAs 1-4 so that if one of the DMAs is defective, then a different DMA can be accessed to obtain the defect management information.

It should be noted that in a general BD-RE, since data can be repeatedly recorded on and erased from a DMA (although the size of the DMA is limited), a DMA of large size is not required. However, in a BD-WO according to the present invention, since data cannot be repeatedly recorded on and erased from the DMA, a DMA of large size is required for defect management.

Still referring to FIG. 3, the lead-in area further includes a temporary defect management area (TDMA 1) for temporarily storing defect management information therein. The data area includes an inner spare area ISA0, a user data area, and an outer spare area OSA0. Parts of or the entire ISA0 and OSA0 are used as replacement areas for defective areas in the user data area according to linear replacement. The outer spare area OSA0 includes a temporary defect management area (TDMA 2). The defect management information temporarily stored in the TDMA 1 and/or TDMA 2 is also referred to herein as TDMA information.

In one embodiment, the TDMA 1 allocated to the lead-in area has a fixed size, whereas the TDMA 2 allocated to the outer spare area OSA0 has a variable size depending upon the size of the spare area(s). For example, if the OSA0 has a size of N×256 clusters where N>0 (N=integer), then the TDMA 2 has a size of P clusters where P=(N×256)/4.

In one example, the same information may be written in each of the TDMAs 1 and 2. In another example, the TDMAs 1 and 2 may be sequentially used to sequentially record the TDMA information. Regardless, during replacement writing operations for writing data of a defective area onto a spare area, TDMA information is generated (e.g., under control of the microcomputer 26) and written onto the TDMAs 1 and/or 2. The TDMAs are also updated periodically or as needed. When the BD-WO is ready to be finalized (e.g., data writing operation in the user data area is completed, the TDMA(s) are full, or a finalize command received from a user, etc.), then the TDMA information (latest version) temporarily written in the TDMA(s) is transferred and written onto one or each of the DMAs 1-4.

The TDMA information written in each of the TDMAs 1 and 2 includes temporary defect list (TDFL) information and temporary disc definition structure (TDDS) information. In one embodiment, the TDFL information includes one or a plurality of TDFLs (TDFL #1~TDFL #n). Each TDFL includes one or a plurality of defect entries identifying defects and corresponding replacement areas on the disc. Each defect entry includes location information pertaining to a defective area of the user data area and the corresponding replacement area. For example, during a data recording operation on the BD-WO, if a defective area is found in the user data area, then data written or to be written in that defective area is written in a part (replacement area) of a spare area (e.g., ISA0 or OSA0) according to a linear replacement scheme. Then the information pertaining to the defective area and the replacement area and their relationship is entered as a defect entry in the TDFL. For instance, this information may include a first physical sector number of the defective area on the disc, a first physical sector number of the replacement area (spare area) corresponding to that defective area, and any other data pertaining to the defect for defect management.

In one embodiment, the TDDS information written in each of the TDMAs 1 and 2 includes one or a plurality of TDDSs (TDDS #1~TDDS #n). Each TDDS has a fixed size (e.g., one cluster) and includes location information pertaining to the TDFL(s) so that the location of any TDFL can be quickly identified by accessing the TDDS(s). This location information can be written in a portion of Sector 0 of the one cluster and may include one or more physical sector numbers each indicating a location of a TDFL written on the BD-WO, and any other information pertaining to the TDFL information. Here, a cluster has 32 sectors each sector having 2048 bytes.

Each TDDS also includes recording mode information. The recording mode information identifies a recording mode of the BD-WO and can be written in a portion of Sector 0 of the one cluster. The location information pertaining to the TDFL(s) and the recording mode information discussed above are also referred to herein as a TDDS part. Here, the TDDS part occupies the entire Sector 0 (or any other designated location area).

Each TDDS further includes disc usage management information, which identifies the status of a recording area of the BD-WO and which can be represented in one of the two forms: track information (Track-Info) and space bitmap information (SBM). This structure of the TDDS will be discussed in more detail later by referring to FIG. 4.

As the data recording operation for writing data into the data area progresses, the TDMAs may be updated periodically to reflect any recently discovered defective areas and corresponding replacement areas. After each updating of the TDMA, a TDFL and a corresponding TDDS, which may include all previous TDMA information and the recently generated TDMA information, may be written in the TDMA. In this aspect, the latest TDDS and TDFL written in the TDMA of the BD-WO would include the latest TDMA information. Then when the BD-WO is to be finalized, the latest TDDS and TDFL written on the BD-WO are transferred and written in one or each of the DMAs 1-4 as the final and most-updated defect management information.

Figure 4:
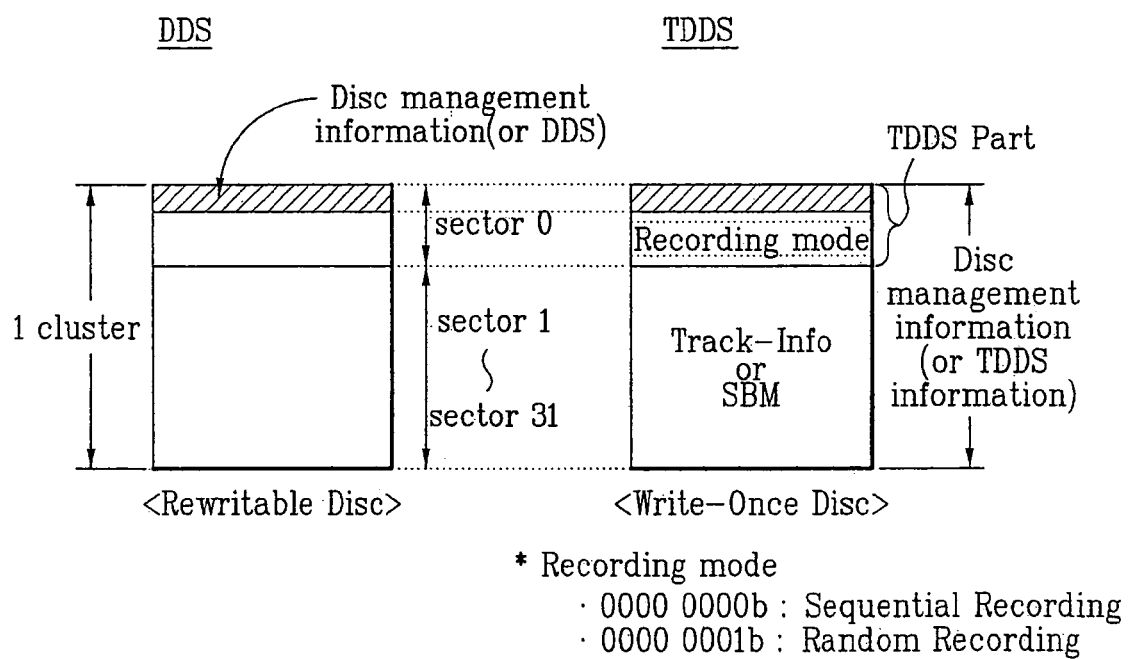
FIG. 4 illustrates an example of a DDS structure on a rewritable disc, a TDDS structure on a BD-WO and a disc management information recording method for the BD-WO according to an embodiment of the present invention.

FIG. 4 illustrates a DDS structure of a rewritable disc, an example of a TDDS structure on a BD-WO and a disc management information recording method for the BD-WO according to an embodiment of the present invention. As shown in FIG. 4, in the DDS of a general rewritable optical disc, only 60 byte information corresponding to an extremely small portion of 1 cluster is used to store therein the DDS information. The entire remaining part of the DDS is all set to 'zero padding'.

In contrast, in the BD-WO, the entire TDDS area is used to store therein the TDDS information. As shown in FIGS. 3 and 4, the TDDS part (including the location information and the recording mode information) are written in the entire Sector 0 of the cluster assigned as the TDDS, whereas Sectors 1-31 store therein the disc usage management information (Track-Info or SBM). In another example, the disc usage management information can be recorded on the first 31 sectors (Sectors 0~30) in the TDDS, and any remaining disc usage management information can be recorded on the last $32^{nd}$ sector (Sector 31) in the TDDS along with the TDDS part.

The recording mode information identifies one of a plurality of recording modes employed in the BD-WO according to the present invention. In this example, a value of "0000 0000" may be used to indicate a sequential recoding mode, and a value of "0000 0001" may be used to indicate a random recording mode. Obviously, other examples are possible. Information about the BD-WO according to the present invention can be variously determined depending upon the needs through a process of specification regulation.

The disc usage management information is varied in dependence upon the disc usage. In the BD-WO, the disc usage management information is required for accurately searching and detecting the start point of an available recording area, and is used to distinguish a recording area from a non-recording area on the disc. In this aspect, the disc usage management information indicates where the available recording area and the recorded area are located within the data area (e.g., user data area).

As mentioned above, the disc usage management information can be represented as either the track information (Track-Info) or the space bitmap information (SBM). The Track-Info is generally used when the BD-WO is recorded in a sequential recording mode. The SBM is generally used when the BD-WO is recorded in a random recording mode. These recording modes can be determined depending on the recording mode identified in the recording mode information stored in the TDDS.

In conventional writable-once optical discs, the recording status/mode information is expressed as 'track information' in case of compact disc series, and as 'Rzone', 'Fragment' or 'recording range' in case of DVD series. But in the present invention, the aforementioned various expressions relating to the recording status/mode information are commonly designated as 'Track-Info', and accordingly the Track-Info will be appreciated as having such meaning irrespective of expressions.

In one example, since the tracks on the BD-WO are sequentially used to record during the sequential recording mode, the Track-Info identifies the start point (location) of the recording area (e.g., user data area) of the BD-WO, and the end point (location) of the last recorded portion of the recording area. This information then indicates the start of the next available portion of the recording area on the BND-WO.

The bitmap information identifies a start point of an available recordable portion of the recording area on the BD-WO using bit values such as '0' and '1'. For instance, if a particular cluster area of the recording area on the BD-WO has been recorded, then it is indicated by allocating a value of '1' to every minimal recording unit (1 cluster). If a cluster area of the recording area has no recorded data thereon, then that cluster is assigned to a value of '0'. In this manner, if the SBM indicates that a particular cluster has a value of '1' assigned thereto, then it indicates that that cluster has been already used (i.e., it has recorded data thereon). If the SBM indicates that a particular cluster has a value of '0', then it indicates that that cluster has not been used yet (i.e., it has no recorded data thereon). Obviously, the reversal or some other values may be used to indicate the recording/non-recording state of each area unit such as the clusters of the user data area. Thus, the SBM makes it possible to express a recording usage status of the disc even in the random recording mode.

Figure 12:
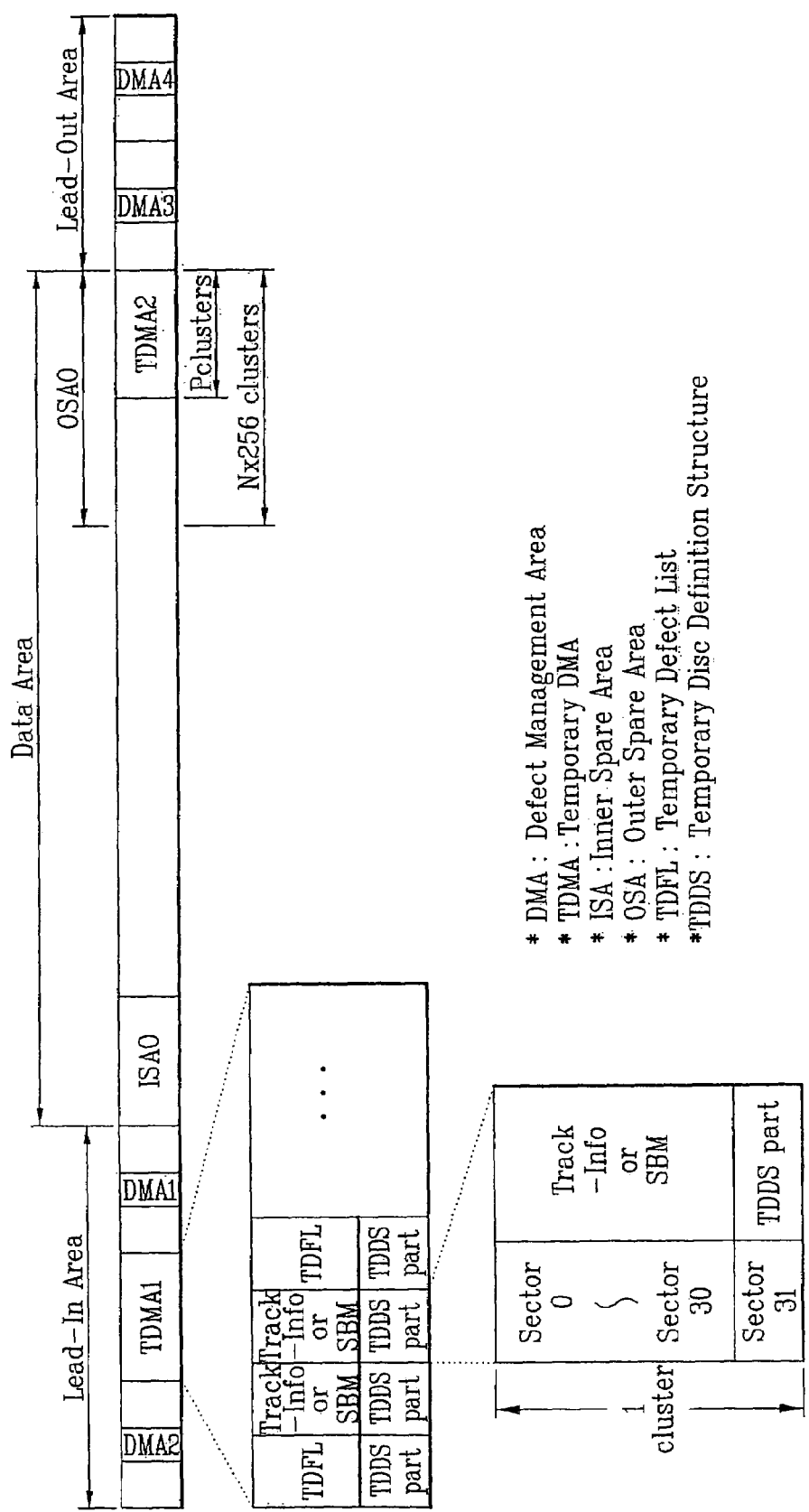
FIG. 12 illustrates a structure of a writable-once optical disc such as a single layer BD-WO according to another embodiment of the present invention.

FIG. 12 illustrates a structure of a writable-once optical recording medium, such as a single-layer BD-WO, according to another embodiment of the present invention. The BD-WO structure of FIG. 12 is identical to the BD-WO structure of FIG. 3, except that the TDDS part, which includes the location information of the TDFL(s) and the recording mode information, is updated and written after each update state, as shown in FIG. 12. In this aspect, the disc usage management information (Track-Info or SBM) is stored in Sectors 0-30 of one cluster, and the TDDS part is stored in Sector 31 of the one cluster. The TDDS part occupies the entire Sector 31. In another example, the TDDS part may be stored in the entire Sector 0 of one cluster, and the Track-Info or SBM may be stored in Sectors 1-31 of the one cluster.

Figure 5:
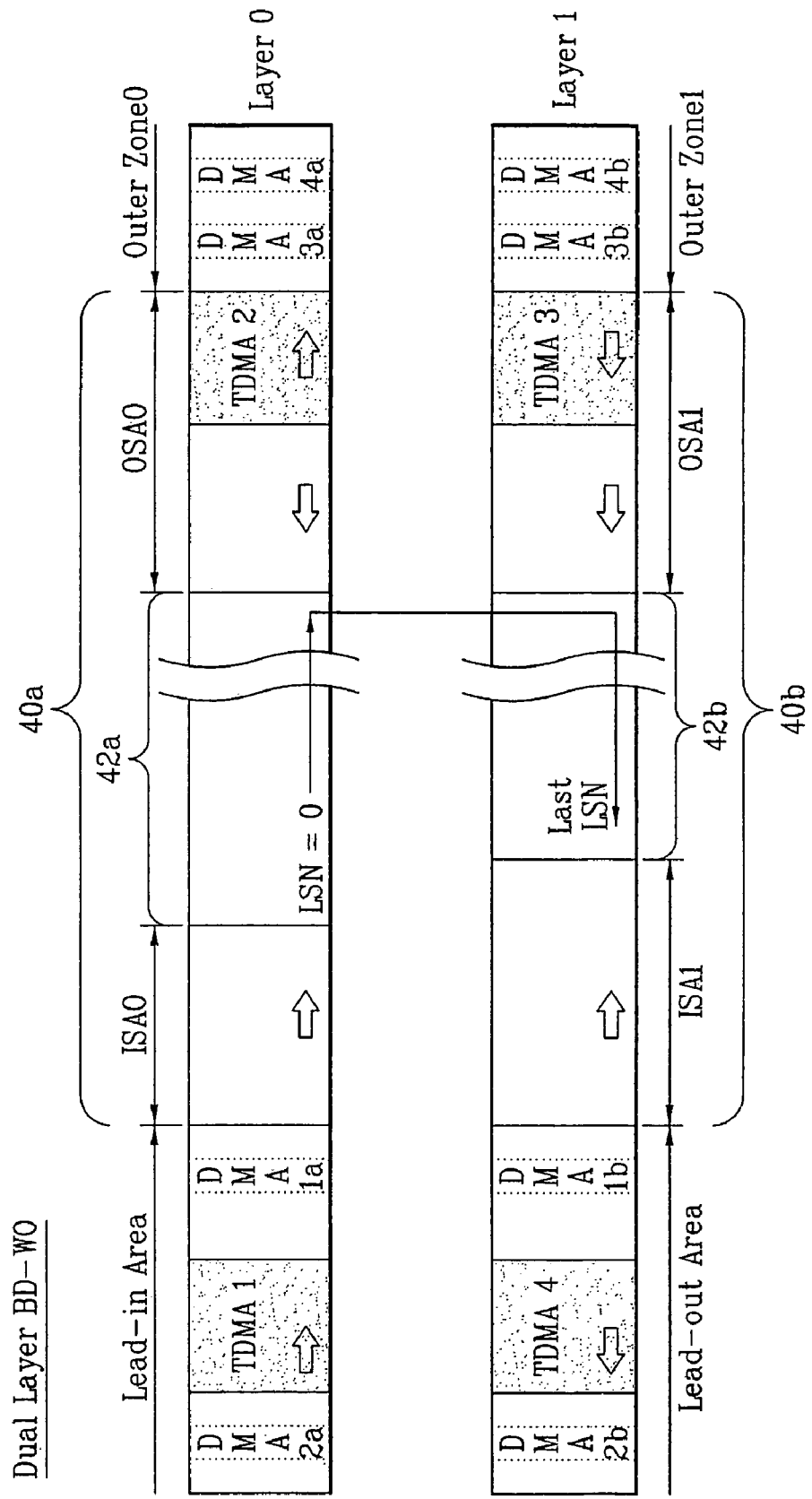
FIG. 5 illustrates a structure of a writable-once optical disc such as a dual layer BD-WO according to an embodiment of the present invention.

FIG. 5 illustrates a structure of a dual layer BD-WO according to an embodiment of the present invention. The structure of the dual layer BD-WO and designations of each area shown in FIG. 5 are exemplary for description convenience and understanding, and does not limit to the scope of the present invention.

Referring to FIG. 5, the BD-WO includes two recording layers. The first recording layer (Layer 0 or L0) includes a lead-in area, a data area 40a, and an outer zone area Outer Zone 0. The second recording layer (Layer 1 or L1) includes a lead-out area, a data area 40b and an outer zone area Outer Zone 1. The lead-in area of the first recording layer (Layer 0) includes a temporary defect management area TDMA 1 and a plurality of final defect management areas DMA1a and DMA 2a. The lead-out area of the second recording layer (Layer 1) includes a temporary defect management area TDMA 4, and a plurality of final defect management areas DMA 1b and DMA 2b. Additional final defect management areas (e.g., DMAs 3a, 3b, 4a, 4b) are also provided in the Outer Zone 0 and/or the Outer Zone 1.

The data area 40a of the first recording layer (Layer 0) includes an inner spare area ISA0, a user data area 42a, and an outer spare area OSA0. The data area 40b of the second recording layer (Layer 1) includes an inner spare area ISA1, a user data area 42b, and an outer spare area OSA1. The outer spare area OSA0 and/or the outer spare area OSA1 includes a TDMA (e.g., TDMA 2 or TDMA 3). The arrows depicted in each of the areas shown in FIG. 5 are examples of a data recording direction.

Similar to the single layer BD-WO, the TDMAs 1 and 4 may have a fixed size, whereas the TDMAs 2 and 3 in the spare areas may have a variable size depending upon the size of the spare area(s). For example, if the OSA0/OSA1 has a size of N×256 clusters where N>0 (N=integer), then the TDMA 2/TDMA 3 has a size of P clusters where P=(N×256)/4.

The use and structure of the DMAs and TDMAs on the single layer BD-WO as discussed above applies equally to the DMAs and TDMAs on the dual layer BD-WO. One difference is that each of the DMAs 1a-4b in each recording layer of the dual layer BD-WO has a size of 32 clusters such that a DMA in the first recording layer and a corresponding DMA in the second recording layer constitute one full DMA. For instance, the DMAs 1a and 1b constitute one DMA, the DMAs 2a and 2b constitute one DMA, the DMAs 3a and 3b constitute one DMA, and the DMAs 4a and 4b constitute one DMA. In this regard, same information is recorded in each of the DMAs 1a, 2a, 3a and 4a of the first recording layer. Information, which may be different from the information recorded in the DMAs 1a, 2a, 3a, 4a, is recorded in each of the DMAs 1b, 2b, 3b and 4b.

When the BD-WO is to be finalized (e.g., data writing operation in the user data area is completed, the TDMA(s) are full, or a finalize command received from a user, a host, a disk manufacturer, etc.), the TDMA information already stored in the TDMA(s) is now written onto the DMA(s) as DMA information. This process of transferring the TDMA information into the DMA will now be discussed according to the embodiments of the present invention by referring to FIGS. 6A-11, where dual layer BD-WOs are discussed.

FIGS. 6A and 6B illustrate a structure of clusters for one DMA of a general dual layer BD-RE (rewritable disc) and are provided to explain further the aspects of the present invention. The method of transferring the TDMA information for the BD-WO according to the present invention assures some reciprocity with the rewritable optical disc (BD-RE).

Similar to the DMA structure of the BD-WO, the BD-RE includes as shown in FIG. 6A, one DMA composed of a DMA part (Clusters 1-32) from the first recording layer and a DMA part (Clusters 33-64) from the second recording layer, which are accessed according to the tracking direction indicated with the arrow. As shown in FIG. 6B, the same DDS information is repeatedly recorded on the Clusters 1~4 of the DMA, and the DFL information is repeatedly recorded on the Clusters 9~64 of the DMA. However, in the BD-RE, the Clusters 5~8 are not used at all for defect management.

The present invention as shown in, e.g., FIGS. 7-11 provides a newly defined DMA structure for a dual layer BD-WO based on the DMA structure of the BD-RE of FIGS. 6A and 6B, for assuring reciprocity with the rewritable optical disc (BD-RE). Referring to FIGS. 7 to 11, several embodiments of the present invention will be discussed wherein, when the latest disc management information is finalized in a TDMA of the BD-WO, a disc finalize command is received, the TDMA(s) is full, etc., it is transferred and recorded on a DMA of the BD-WO. Particularly, the latest TDFL information and the latest TDDS information in a TDMA are transferred to the DMA as DFL information and DDS information, respectively. This transfer process is also called herein as the TDMA information transfer process.

It should be understood that one DMA shown in each of FIGS. 7 to 10 corresponds to one DMA composed of DMA parts from the first and second recording layers. For instance, one DMA (Clusters 1~64) shown in each of FIGS. 7-10 is composed of the DMA 2a (Clusters 1-32) in the first recording layer and the DMA 2b (Clusters 33-64) in the second recording layer of the BD-WO shown in FIG. 5. Also one TDMA shown in each of FIGS. 7-11 corresponds to a TDMA (e.g., TDMA 1, 2, 3 or 4) on the BD-WO shown in FIG. 5.

Figure 7:
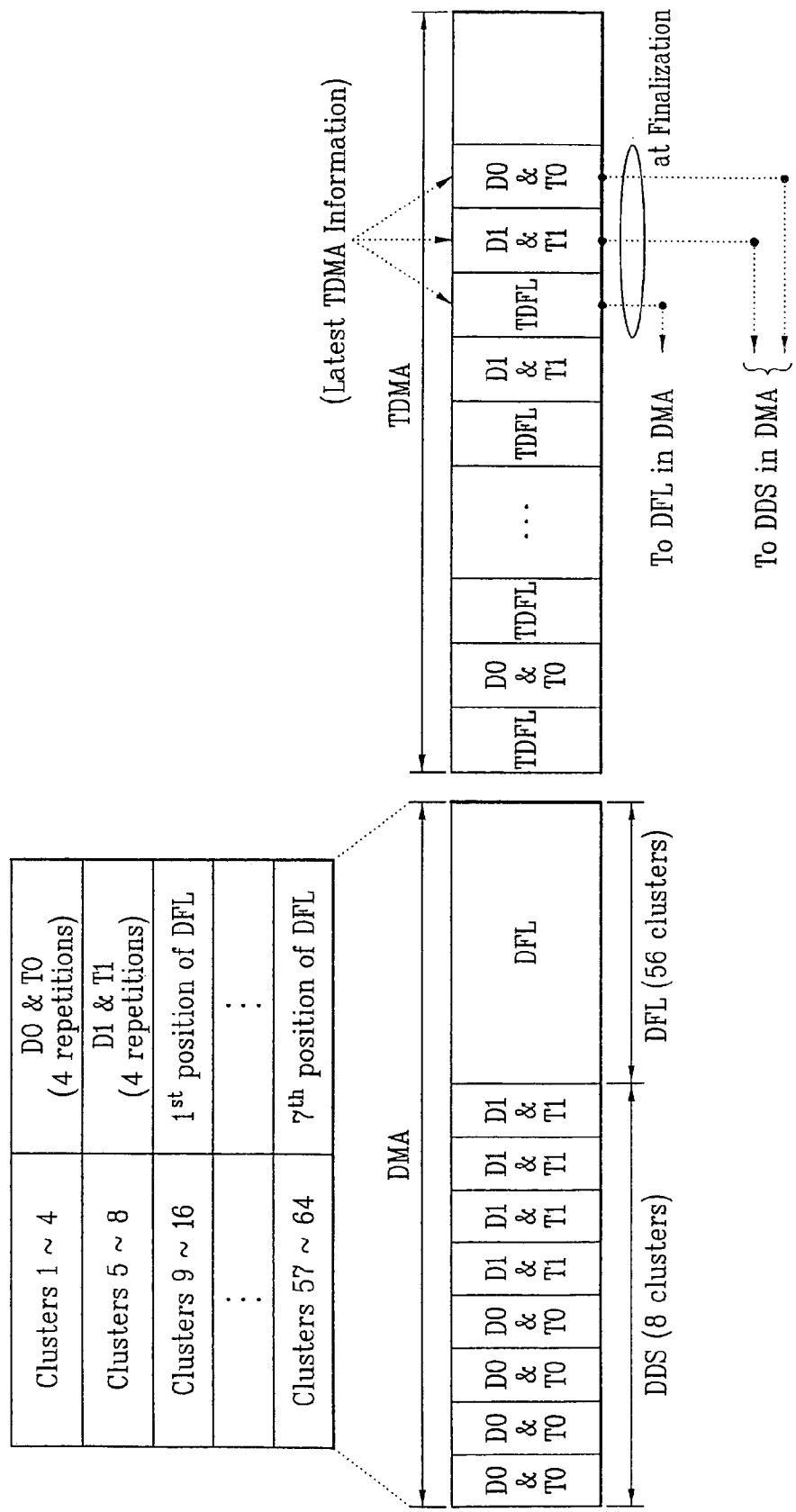
FIG. 7 illustrates a structure of a DMA and a TDMA of a dual layer BD-WO and a method of transferring data from the TDMA to the DMA according to an embodiment of the present invention.

FIG. 7 illustrates a structure of a DMA and a TDMA of a dual layer BD-WO and a method of transferring data from the TDMA to the DMA according to an embodiment of the present invention.

Referring to FIG. 7, during the TDMA information transfer process, the latest defect management information (latest TDFL information and latest TDDS information) in the TDMA is transferred to and recorded on a DMA of the BD-WO. Among the TDDS information, the TDDS part (including the TDFL location information and the recording mode information) and the disc usage management information (Track-Info or SBM) (e.g., as shown in FIGS. 3 and 4) are transferred onto the DMA. In this example, the Clusters 1-8 of the DMA are designated as a DDS section, whereas the Clusters 9-64 of the DMA are designated as a DFL section. All the clusters of the DMA in the BD-WO are designated for storing management data.

More specifically, the disc usage management information (D0) and the TDDS part (T0) for the first recording layer L0, which may be written separately in the TDMA from the disc usage management information (D1) and the TDDS part (T1) for the second recording layer L1, are transferred and written separately and repeatedly into the DMA. In this example, the D0 and T0 for the first recording layer L0 are repeatedly (four times) recorded on the Clusters 1 to 4 of the DDS section. Further, the D1 and T1 for the second recording layer L1 are repeatedly (four times) recorded on the Clusters 5 to 8 of the DDS section in the DMA. As a result, the DDS section of the DMA includes the latest TDDS part and the latest disc usage management information for the first and second recording layers written in the following order: D0&T0, D0&T0, D0&T0, D0&T0, D1&T1, D1&T1, D1&T1, D1&T1, where D0&T0 or D1&T1 is recorded in one unit size, e.g., one cluster size. In this aspect, in one example, the T0/T1 written in the DDS section of the DMA may identify the location of the DFLs in the DMA on the BD-WO, and not necessarily the location of the TDFLs in the TDMA on the BD-WO.

Moreover, the Clusters 9-64 (DFL section) of the DMA are used to store therein DFL information which corresponds to or is based on the latest TDFL information in the TDMA. In this example, the same DFL information can be written repeatedly (e.g., up to seven times) in the DFL section of the DMA. Storing the same information repeatedly in the DDS section or the DFL section ensures that the DMA information is not lost (e.g., due to a defect in a portion of the DMA) and is accurately and completely accessed each time it is needed.

In one embodiment, the latest disc usage management information is recorded each on the front part of a first DMA in the lead-in area and/or on the front/rear part of a DMA in the lead-out area (depending on whether the disc is a single layer or multiple layer). This allows the disc usage management information to be accessed quickly at the initial loading time of the disc. Further, the data reliability and data preservation can be assured by repetitive recording of same information in different parts of the disc. For instance, if the Clusters 1-32 of the DMA shown in FIG. 7 is assumed to correspond to the DMA 2a shown in FIG. 5, then the information recorded in the Clusters 1-32 shown in FIG. 7 is repeatedly recorded in each of the other DMAs 1a, 3a and 4a of the first recording layer. Similarly, if the Clusters 33-64 of the DMA shown in FIG. 7 is assumed to correspond to the DMA 2b shown in FIG. 5, then the information recorded in the Clusters 33-64 shown FIG. 7 is repeatedly recorded in each of the other DMAs 1b, 3b and 4b of the second recording layer.

Figure 8:
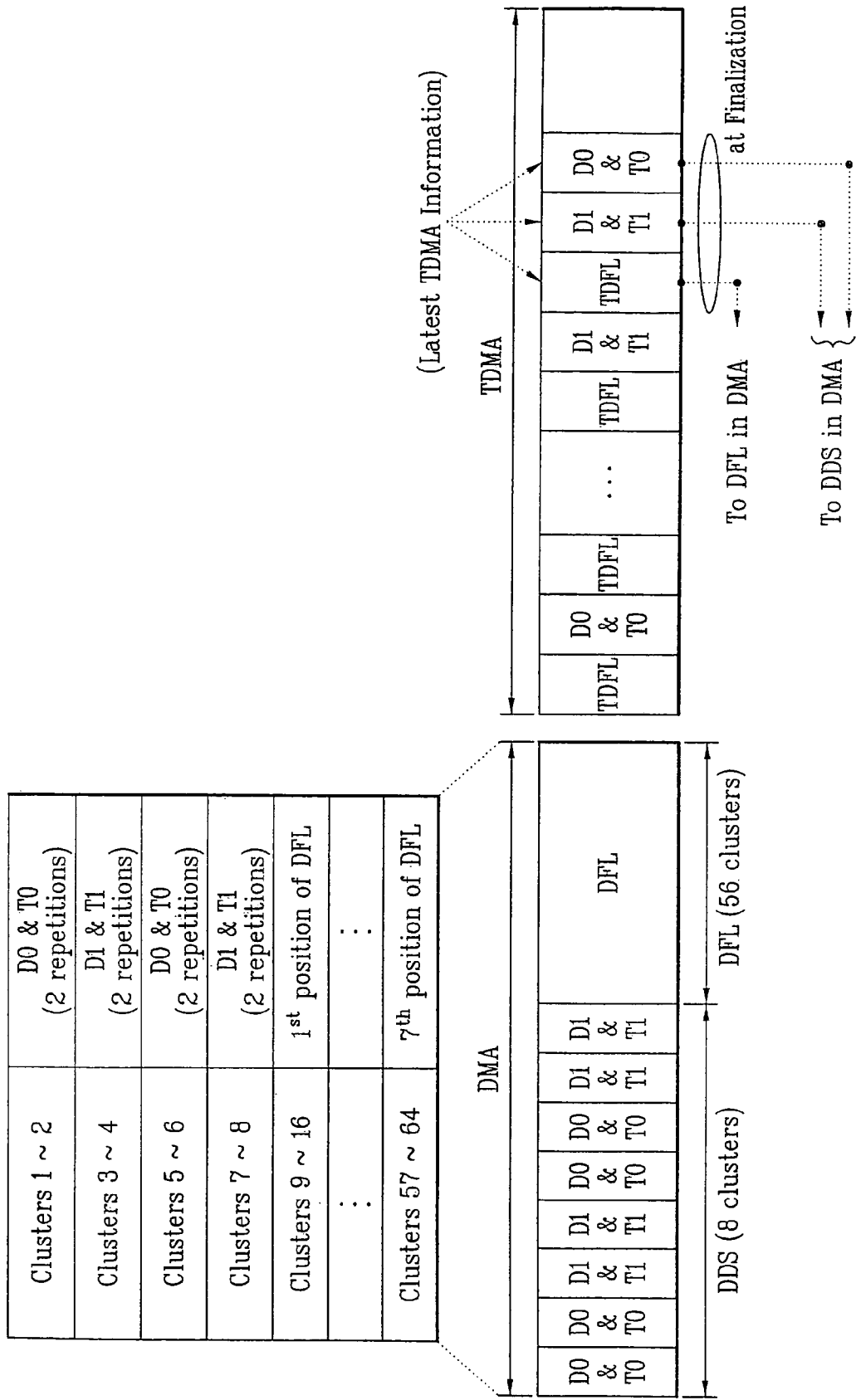
FIG. 8 illustrates a structure of a DMA and a TDMA of a dual layer BD-WO and a method of transferring data from the TDMA to the DMA according to an embodiment of the present invention.

FIG. 8 illustrates a structure of a DMA and a TDMA of a dual layer BD-WO and a method of transferring data from the TDMA to the DMA according to an embodiment of the present invention. This example is identical to the example of FIG. 7, except that in this example, the latest disc usage management information D0 and the latest TDDS part T0 for the first recording layer L0 is 4-times recorded in the Clusters 1-2 and 5-6 of the DMA, and the latest disc usage management information D1 and the latest TDDS part T1 for the second recording layer L1 is also 4-times recorded in the Clusters 3-4 and 7-8 of the DMA. As a result, the DDS section of the DMA includes the latest TDDS part and the latest disc usage management information for the first and second recording layers written in the following order: D0&T0, D0&T0, D1&T1, D1&T1, D0&T0, D0&T0, D1&T1, D1&T1, where D0&T0 or D1&T1 is recorded in one unit size, e.g., one cluster size. In another variation, the Clusters 5 to 8 in the DMA can be in a reserved state without any repetitive recording such that only the Clusters 1-4 (and not the Clusters 5-8) have the D0, T0, D1 and T1 recorded thereon.

Figure 9:
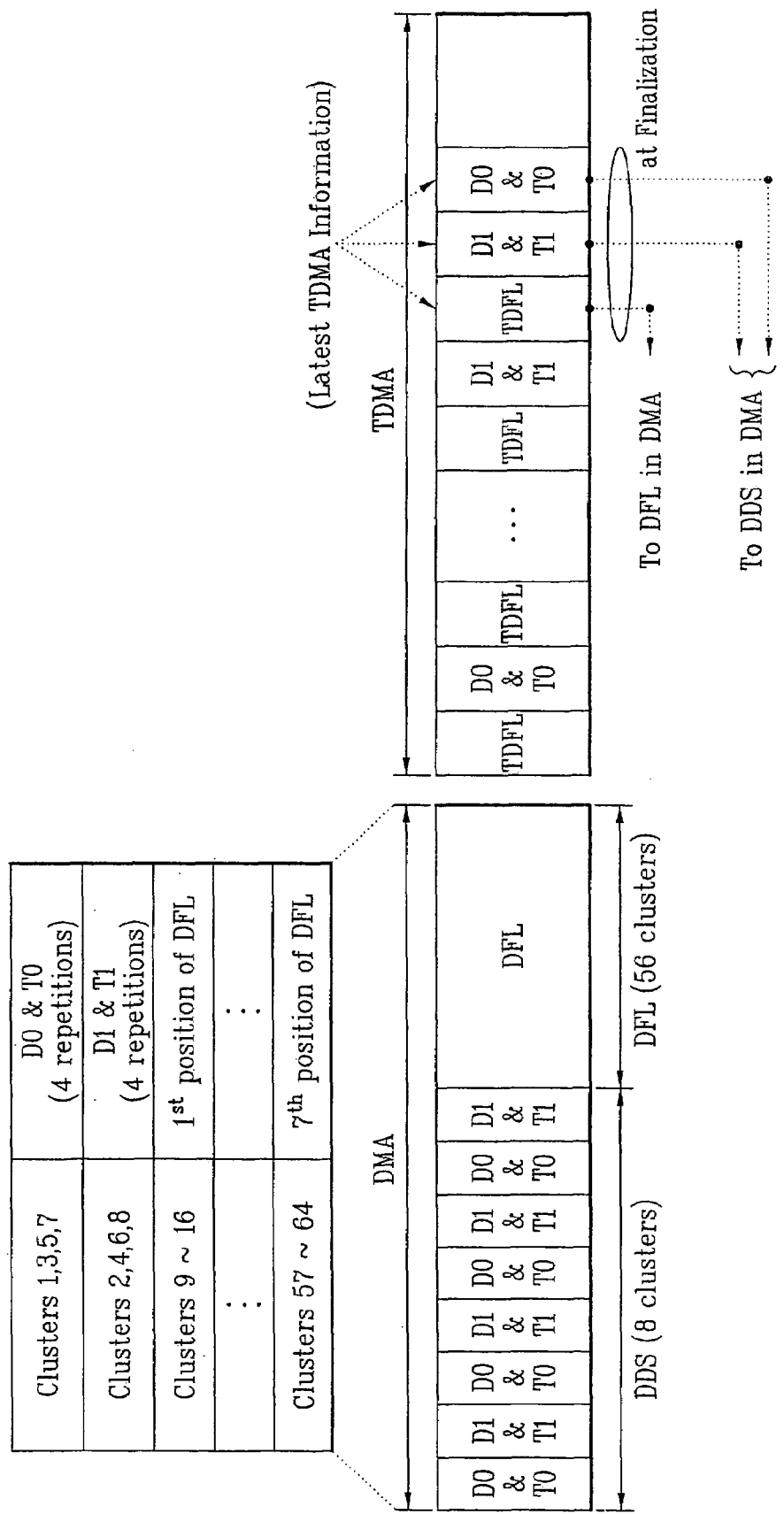
FIG. 9 illustrates a structure of a DMA and a TDMA of a dual layer BD-WO and a method of transferring data from the TDMA to the DMA according to an embodiment of the present invention.

FIG. 9 illustrates a structure of a DMA and a TDMA of a dual layer BD-WO and a method of transferring data from the TDMA to the DMA according to an embodiment of the present invention. This example is identical to the example of FIG. 7, except that in this example, each of the (D0&T0) and (D1&T1) for the first and second recording layers L0 and L1 is alternatively and repeatedly recorded in the DDS section of the DMA by the unit of, e.g., one cluster.

Particularly, as shown in FIG. 9, the latest D0 and T0 for the first recording layer L0 is recorded in each of the Clusters 1, 3, 5 and 7 of the DMA, and the latest D1 and T1 for the second recording layer L1 is recorded in each of the Clusters 2, 4, 6 and 8 of the DMA. As a result, the DDS section of the DMA includes the latest TDDS part and the latest disc usage management information for the first and second recording layers written in the following order: D0&T0, D1&T1, D0&T0, D1&T1, D0&T0, D1&T1, D0&T0, D1&T1, where D0&T0 or D1&T1 is recorded in one unit size, e.g., one cluster size. In another variation, the Clusters 5 to 8 in the DMA can be in a reserved state without any repetitive recording such that only the Clusters 1-4 (and not the Clusters 5-8) have the D0, T0, D1 and T1 recorded thereon.

Figure 10:
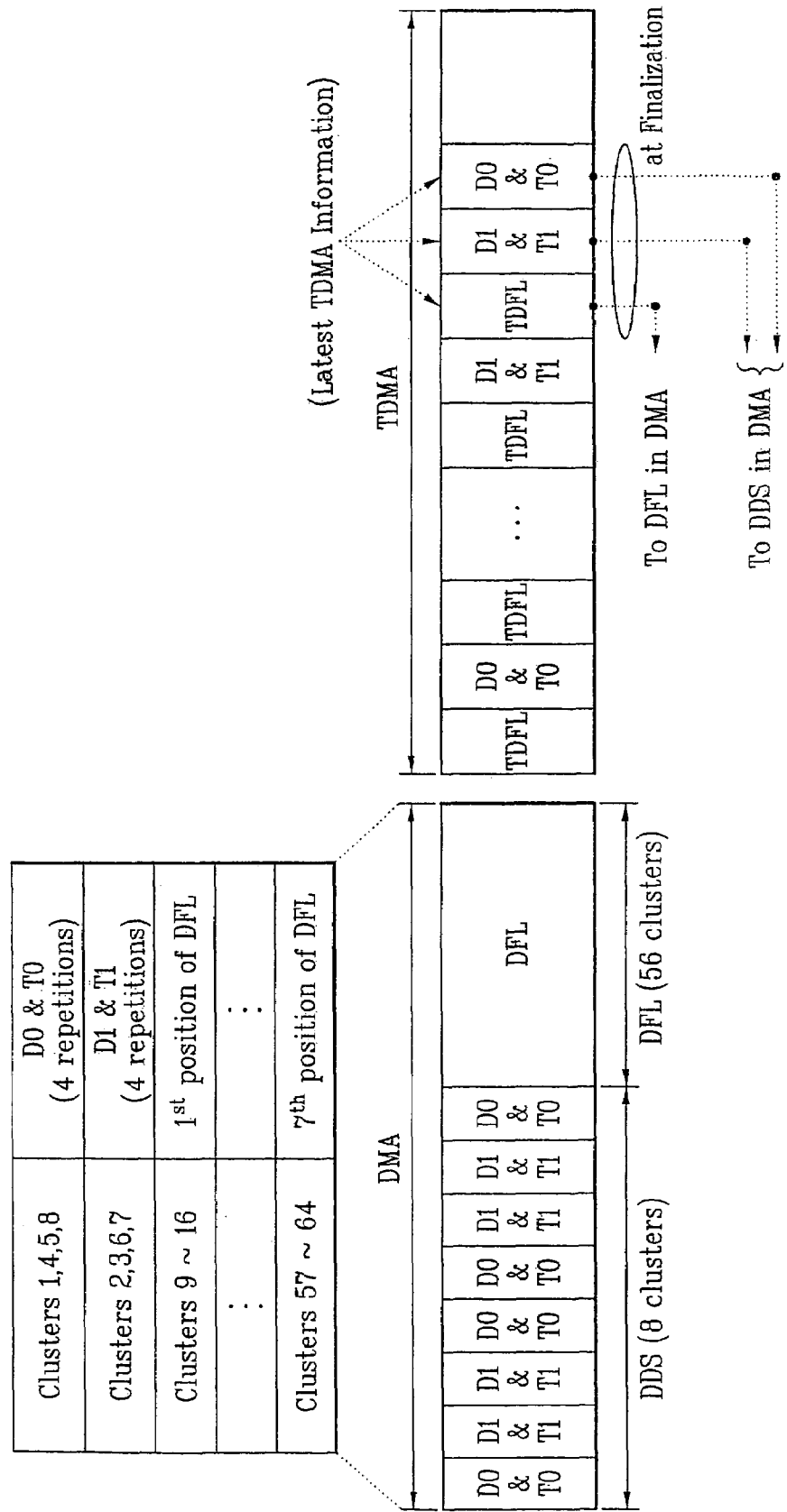
FIG. 10 illustrates a structure of a DMA and a TDMA of a dual layer BD-WO and a method of transferring data from the TDMA to the DMA according to an embodiment of the present invention.

FIG. 10 illustrates a structure of a DMA and a TDMA of a dual layer BD-WO and a method of transferring data from the TDMA to the DMA according to an embodiment of the present invention. This example is identical to the example of FIG. 7, except that in this example, the latest D0&T0 and D1&T1 are recorded in the DDS section of the DMA in that order. Then the same information is recorded in the reverse order in the subsequent fields, or the subsequent fields are reserved.

Particularly, in this example, as shown in FIG. 10, the latest D0 and T0 for the first recording layer L0 are recorded in each of the Clusters 1, 4, 5 and 8 of the DMA, and the latest D1 and T1 for the second recording layer L1 are recorded in each of the Clusters 2, 3, 6 and 7 of the DMA. As a result, the DDS section of the DMA includes the latest TDDS part and the latest disc usage management information for the first and second recording layers written in the following order: D0&T0, D1&T1, D1&T1, D0&T0, D0&T0, D1&T1, D1&T1, D0&T0, where D0&T0 or D1&T1 is recorded in one unit size, e.g., one cluster size. In another variation, the Clusters 5 to 8 in the DMA are in a reserved state without any repetitive recording such that only the Clusters 1-4 (and not the Clusters 5-8) have the D0, T0, D1 and T1 recorded thereon in the order of: D0&T0, D1&T1, D1&T1, and D0&T0.

The above sequence of D0&T0, D1&T1, D1&T1, and D0&T0 prevents all or most of the disc usage management information for one recording layer from being simultaneously destroyed or illegible due to the fact that the recording area of the disc is substantially shaped in circles and a defect such as a scratch on the disc is generated in a linear direction across one or more circles.

In the embodiments of FIGS. 7-10, if the track information (Track-Info) is used as the disc usage management information for the BD-WO, then the first and second disc usage management information D0 and D1 for the first and second recording layers will be the same. As a result, the same latest disc usage management information is recorded in the DMA for both the first and second recording layers.

Figure 11:
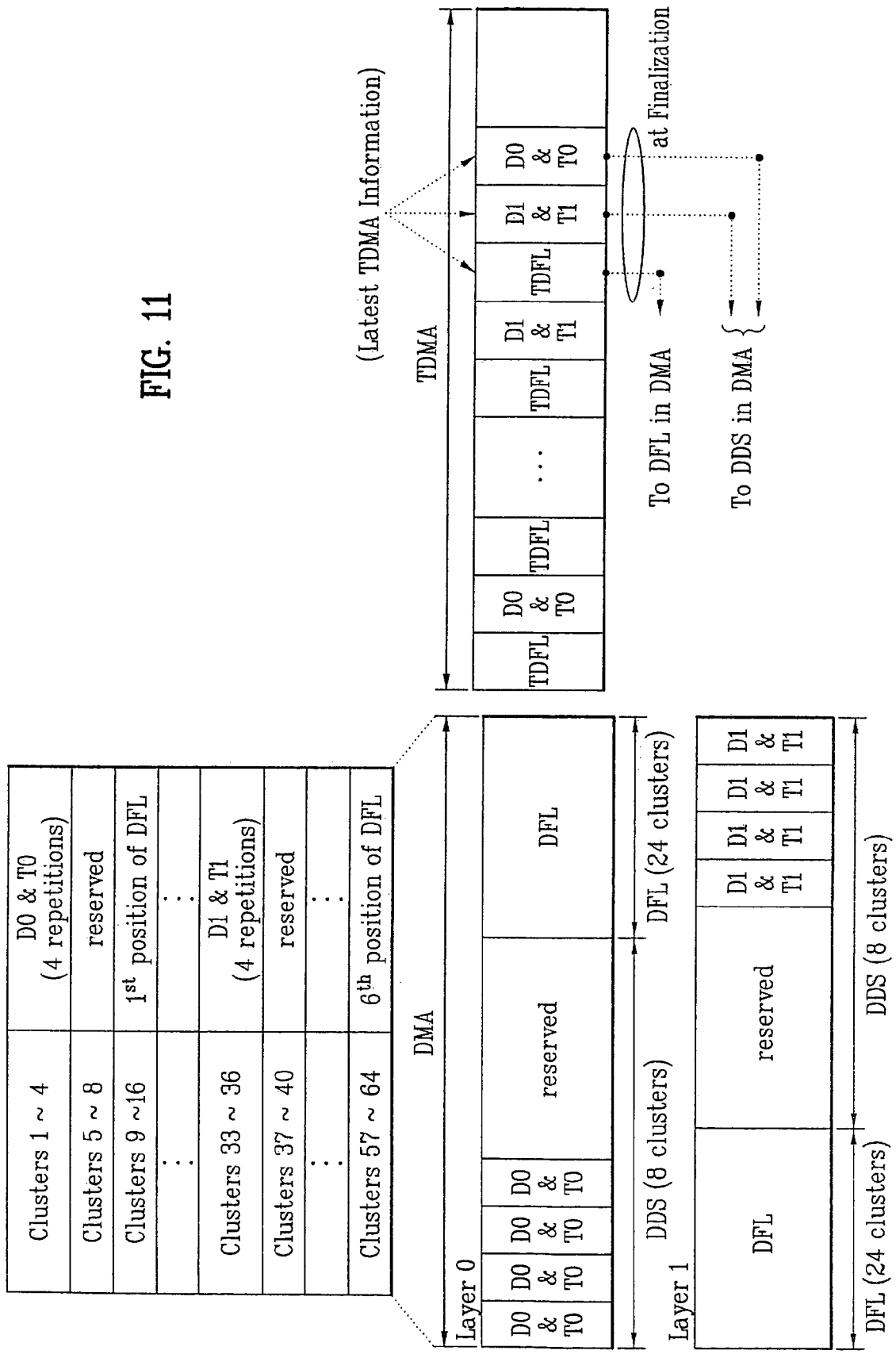
FIG. 11 illustrates a structure of a DMA and a TDMA of a dual layer BD-WO and a method of transferring data from the TDMA to the DMA according to an embodiment of the present invention.

FIG. 11 illustrates a structure of a DMA and a TDMA of a dual layer BD-WO and a method of transferring data from the TDMA to the DMA according to an embodiment of the present invention. This example is identical to the example of FIG. 7, except that in this example, the latest D0 and T0 for the first recording layer L0 are repeatedly (e.g., four times) recorded in the Clusters 1 to 4 of the DMA, and the latest D1 and T1 for the second recording layer L1 are repeatedly (e.g., four times) recorded in the Clusters 33 to 36 of the DMA. Here, the Clusters 1-32 of the DMA are located on the first recording layer L0 (e.g., as the DMA 2a of FIG. 5), and the Clusters 33-64 of the DMA are located on the second recording layer L1 (e.g., as the DMA 2b of FIG. 5). As a result, the disc usage management information for the first recording layer is distinguished from the disc usage management information for the second recording layer by being recorded in different recording layers. Also, the Clusters 5-8 and 37-40 are reserved and the Clusters 9-32 and 41-64 are used to store therein DFL information as discussed above.

Although the specific number and order of the repetitions have been identified for recording the D0&T0 and D1&T1 in association with the FIGS. 7-11 embodiments, the present invention is not limited to such and encompasses any other number and/or different order of the repetitions.

According to the present invention, in a single layer BD-WO case, the latest T0 and D0 for the single recording layer are repeatedly recorded in the DDS section of the DMA. Similarly, the latest TDFL information is repeatedly recorded as needed in the DFL section of the DMA.

It will be apparent to those skilled in the art that various modifications and variations can be made in the present invention. Thus, it is intended that the present invention covers the modifications and variations of this invention provided they come within the scope of the appended claims and their equivalents.

What is claimed:

1. A method of managing an optical recording medium, the recording medium including a plurality of recording layers, each recording layer having at least one temporary defect management area and at least one final defect management area, the method comprising:
   recording temporary management information in a temporary defect management area of the recording medium, the temporary management information including disc usage management information indicating a recording or non-recording status of a user area of the each recording layer; and
   transferring the disc usage management information from the temporary defect management area to the at least one final defect management area of the recording medium, wherein in the recording step, the disc usage management information for each of the recording layers is separately recorded in the temporary defect management area.

2. The method of claim 1, wherein the disc usage management information includes a first disc usage management information (D0) for a first recording layer of the recording medium and a second disc usage management information (D1) for a second recording layer of the recording medium, such that in the transferring step, the first and second disc usage management information is recorded sequentially in at least one of the final defect management areas of the recording layers according to the following order: D0, D0, D0, D0, D1, D1, D1 and D1.

3. The method of claim 1, wherein the disc usage management information includes a first disc usage management information (D0) for a first recording layer of the recording medium and a second disc usage management information (D1) for a second recording layer of the recording medium, such that in the transferring step, the first and second disc usage management information is recorded sequentially in at least one of the final defect management areas of the recording layers according to the following order: D0, D0, D1, D1, D0, D0, D1 and D1.

4. The method of claim 1, wherein the disc usage management information includes a first disc usage management information (D0) for a first recording layer of the recording medium and a second disc usage management information (D1) for a second recording layer of the recording medium, such that in the transferring step, the first and second disc usage management information is recorded sequentially in at least one of the final defect management areas of the recording layers according to the following order: D0, D1, D0, D1, D0, D1, D0 and D1.

5. The method of claim 1, wherein the disc usage management information includes a first disc usage management information (D0) for a first recording layer of the recording medium and a second disc usage management information (D1) for a second recording layer of the recording medium, such that in the transferring step, the first and second disc usage management information is recorded sequentially in at least one of the final defect management areas of the recording layers according to the following order: D0, D1, D1 and D0.

6. The method of claim 1, wherein the disc usage management information represents a space bit map.

7. The method claim 1, wherein the transferring step is performed when the recording medium is to be finalized.

8. The method of claim 7, wherein the recording medium is to be finalized if a data recording operation in a user data area of the recording medium is completed, if the at least one temporary defect management area is full, or if a finalize command is received.

9. The method of claim 1, wherein in the transferring step, the temporary management information is transferred, which further includes temporary defect list information and temporary disc definition structure information, and is latest temporary management information written on the recording medium.

10. An apparatus for managing an optical recording medium, the recording medium including a plurality of recording layers, each recording layer having at least one temporary defect management area and at least one final defect management area, the apparatus comprising: a pickup configured to record data on the recording medium; and a microprocessor configured to control the pickup to record-temporary management information in a temporary defect management area of the recording medium, the temporary management information including disc usage management information indicating a recording or non-recording status of the recording medium, wherein the microprocessor is configured to control the pickup to separately record the disc usage management information for each of the recording layers into the temporary defect management area, and the microprocessor is configured to control the pickup to transfer the disc usage management information from the temporary defect management area to the at least one final defect management area of the recording medium.

11. The apparatus of claim 10, wherein the disc usage management information includes a first disc usage management information (D0) for a first recording layer of the recording medium and a second disc usage management information (D1) for a second recording layer of the recording medium, wherein the microprocessor is configured to control the pickup to sequentially record the first and second disc usage management information into at least one of the final defect management areas of the recording layers according to the following order: D0, D1, D1 and D0.

12. The apparatus of claim 10, wherein the microprocessor is configured to control the pickup to transfer the disc usage management information from the temporary defect management area to the at least one final defect management area when the recording medium is to be finalized.

13. An optical recording medium, comprising:
a plurality of recording layers, each recording layer having at least one temporary defect management area and at least one final defect management area,
wherein temporary management information is recorded in a temporary defect management area of the recording medium, the temporary management information including disc usage management information indicating a recording or non-recording status of the recording medium,
the disc usage management information for each of the recording layers is separately recorded in the temporary defect management area, and
the disc usage management information is transferred from the temporary defect management area to the at least one final defect management area of the recording medium.

14. The recording medium of claim 13, wherein the disc usage management information includes a first disc usage management information (D0) for a first recording layer of the recording medium and a second disc usage management information (D1) for a second recording layer of the recording medium, such that the first and second disc usage management information is recorded sequentially in at least one of the final defect management areas of the recording layers according to the following order: D0, D0, D0, D0, D1, D1, D1 and D1.

15. The recording medium of claim 13, wherein the disc usage management information includes a first disc usage management information (D0) for a first recording layer of the recording medium and a second disc usage management information (D1) for a second recording layer of the recording medium, such that the first and second disc usage management information is recorded sequentially in at least one of the final defect management areas of the recording layers according to the following order: D0, D0, D1, D1, D0, D0, D1 and D1.

16. The recording medium of claim 13, wherein the disc usage management information includes a first disc usage management information (D0) for a first recording layer of the recording medium and a second disc usage management information (D1) for a second recording layer of the recording medium, such that the first and second disc usage management information is recorded sequentially in at least one of the final defect management areas of the recording layers according to the following order: D0, D1, D0, D1, D0, D1, D0 and D1.

17. The recording medium of claim 13, wherein the disc usage management information includes a first disc usage management information (D0) for a first recording layer of the recording medium and a second disc usage management information (D1) for a second recording layer of the recording medium, such that the first and second disc usage management information is recorded sequentially in at least one of the final defect management areas of the recording layers according to the following order: D0, D1, D1 and D0.

18. The recording medium of claim 13, wherein the disc usage management information represents a space bit map.

19. The recording medium of claim 13, wherein the disc usage management information is transferred from the temporary defect management area to the at least one final defect management area when the recording medium is to be finalized.

20. The recording medium of claim 19, wherein the recording medium is to be finalized if a data recording operation in a user data area of the recording medium is completed, if the at least one temporary defect management area is full, or if a finalize command is received.

* * * * *